United States Patent [19]
Morrison

[11] Patent Number: 4,779,889
[45] Date of Patent: Oct. 25, 1988

[54] TRAILER SWIVEL WHEEL

[76] Inventor: Robert L. Morrison, 2420 - 6th St. NW., Minot, N. Dak. 58701

[21] Appl. No.: 2,791

[22] Filed: Jan. 12, 1987

[51] Int. Cl.[4] ......................... B60D 1/14; B62D 61/12
[52] U.S. Cl. ................................................. 280/475
[58] Field of Search .................... 280/475, 82, 83, 84, 280/414.1

[56] References Cited
U.S. PATENT DOCUMENTS

| 2,296,789 | 9/1942 | Johnson | 280/763.1 |
| 3,237,960 | 3/1966 | Ziegler et al. | 280/84 |
| 3,348,861 | 10/1967 | Curtis | 280/414.1 |

Primary Examiner—John A. Pekar
Attorney, Agent, or Firm—Moore & Hansen

[57] ABSTRACT

A trailer swivel wheel assembly incorporating a gooseneck-shaped axle to carry a standard wheel rim and tire. The axle is removably received within a swivel housing pivotably mounted to the tongue bar of a trailer, and pivotable to position the wheel between raised position above the tongue bar, a lowered position below the tongue bar, and intermediate positions therebetween. The trailer swivel is secured at each position by a spring loaded locking pin carried on the swivel housing. The axle swivels within the swivel housing to permit the trailer to be maneuverably positioned while the trailer tongue is supported on the wheel rim and tire.

16 Claims, 1 Drawing Sheet

TRAILER SWIVEL WHEEL

BACKGROUND OF THE INVENTION

This invention relates generally to swivel wheels for use with recreational or multi-purpose trailers to be towed behind a vehicle, and in particular to a trailer swivel wheel having a gooseneck axle which may be mounted upon the tongue of a trailer frame and pivoted between a raised and lowered position.

The use of single-axle recreational and multi-purpose trailers designed to be towed behind passenger vehicles is quite widespread. Such trailers may carry campers, boats, snow-mobiles, machinery, furniture, building materials, and an almost limitless variety of heavy articles.

These trailers generally have a frame supporting a load carrying bed or platform, and a tongue extending forwardly from the frame toward the vehicle, with a hitch attached to the front end of the tongue and designed to couple the trailer to a hitch ball mounted on the rear of the vehicle.

It is often necessary to uncouple the trailer from the vehicle, and it is frequently desirable to reposition the trailer when it is uncoupled from the vehicle, either to facilitate recoupling the trailer to the vehicle or to make use or storage of the trailer more convenient. Towards this end, many trailers are balanced about their single, rear wheel axles so that a person may manually lift the front of the tongue and turn or move the trailer. If the load on the trailer is too heavy or cannot be balanced, the weight on the tongue may become too great to lift and support comfortably or safely, even with the leverage provided by the tongue.

To remedy this problem, various swivel wheel devices have been designed to support the tongue of the trailer on an extra tire while the trailer is uncoupled from the vehicle. The designs of several of these devices permit some combination of movement of the swivel wheel when the trailer is turned or rolled, and allow the swivel wheel to be removed, retracted, or lifted to a raised position clear of the roadway when the trailer is coupled to the vehicle.

U.S. Pat. No. 2,296,789 shows one such device wherein a wheel, axle, and forks are positioned below the tongue of a trailer behind the hitch, and may be pivoted upwards between and within the Y-shaped yoke of the trailer frame.

This device does not permit the swivel wheel to be raised to a position completely above the tongue of the trailer, and a portion of the swivel mechanism, forks, and wheel must be disposed below the tongue bar at all times. This device also requires a specially designed frame, and as such, it is not suitable for retrofitting or mounting on the majority of existing trailers having straight tongue bars.

U.S. Pat. No. 2,926,930 discloses a swivel wheel which may be rotated around a tongue bar having a generally circular cross section, the wheel being turned and the trailer repositioned using a handle which is attached to a pair of forks straddling the wheel.

This swivel wheel design is again incompatible with many of the existing trailer frames having tongue bars made from square tubular steel, and could not be easily adapted to use with conventional trailers. Additionally, modifying a trailer to incorporate this swivel wheel would require replacing the existing hitch assembly, a costly and inconvenient proposition. Furthermore, the use of the handle suggests that this swivel wheel, due to its size and the minimal castering of the forks, is difficult to turn or adjust when repositioning the loaded trailer.

U.S. Pat. No. 3,348,861 shows a trailer support wheel which used the spare wheel and tire from the trailer, and incorporates a mounting arm which may be pivoted between and locked at a fully raised and a fully lowered position, and intermediate positions therebetween.

This trailer support wheel does not appear to have any capacity to swivel about the mounting arm, and as such would not aid one in turning or repositioning the trailer.

U.S. Pat. No. 3,360,282 discloses a similar trailer tongue support using the spare wheel rim and tire of the trailer, but in this case uses a lever mechanism to pivot the wheel rim and tire between the raised and lowered positions.

This trailer tongue support again does not appear to permit the wheel rim and tire to swivel about the mounting arm, and requires a trailer having a vertical boat anchor support or similar frame member to secure the wheel rim and tire in the lowered position. The long lever arm requires a second locking mechanism on the tongue bar to secure the wheel rim and tire in the raised position, which again cannot be completely raised above the tongue bar without the lever arm extending substantially below the tongue bar and creating a hazard. Additionally, the long lever arm consumes a great deal of space along the tongue bar, and could interfere with the hitch, stabilizer bars, winch, or other features or accessories on the trailer.

U.S. Pat. No. 3,314,692 discloses a retractable trailer tongue jack incorporating a swivel wheel which may be pivoted upward to a raised position.

This retractable jack similarly uses a smaller castered wheel which is pivoted up into a recess in the yoke of the trailer frame, therefore precluding mounting the jack on many existing trailers, or using the spare trailer wheel rim or tire. The wheel and pivot mechanism cannot be raised above the trailer tongue, a feature particularly adopted for use with horse trailers having front doors which require clearance above the trailer tongue.

U.S. Pat. No. 3,655,220 shows a spare wheel carrier for supporting the tongue of a trailer in which the wheel rim and tire are carried in a rack and may be pivoted downward to a lowered position on a hinged mechanism which also permits the wheel rim and tire to swivel.

This spare wheel carrier does not permit the wheel rim and tire to be raised above the trailer tongue, and indeed the wheel rim and tire are disposed completely below the trailer tongue when secured in the carrier rack. Furthermore, the swivel wheel disclosed does not provide a significant castering effect, and again requires the use of a sizable portion of the tongue bar for mounting the carrier rack and the pivotable wheel mount.

BRIEF SUMMARY OF THE INVENTION

It is therefore one object of this invention to design a trailer swivel wheel assembly which may be easily mounted upon a wide variety of existing trailer frames, without structural modification of those frames.

It is another object of this invention to design the above trailer swivel such that the wheel, tire, and axle may be raised to a position above the tongue bar when the trailer is coupled to a vehicle or supported by a jack, such that a maximum clearance is maintained between the lowermost portion of the tongue or trailer swivel and the roadway.

It is an additional object of this invention to design the above trailer swivel to include a wheel which may be castered in both the longitudinal direction generally parallel to the tongue bar of the trailer, and in the lateral direction generally perpendicular to the tongue bar of the trailer.

It is a distinct object of this invention to design the above trailer swivel such that a gooseneck type axle may be used to mount the wheel rim and tire upon a pivotable swivel mechanism.

It is yet another object of this invention to design the above trailer swivel such that the pivotable swivel mechanism may securely lock the wheel rim, tire, and axle in a lowered position disposed below the trailer tongue bar, a raised position disposed above the trailer tongue bar, and intermediate positions therebetween.

It is a further object of this invention to design the above trailer swivel to use the spare trailer wheel rim and tire of the trailer.

It is a unique object of this invention to design the above trailer swivel such that the wheel rim, tire, and axle may be quickly and easily removed from the swivel mechanism regardless of the position of the trailer swivel mechanism.

It is still another object of this invention to design the above trailer swivel such that it may be employed on trailer frames having many structural members, obstructions, or other accessories attached thereto which would otherwise interfere with the operation of a trailer swivel wheel.

Briefly described, the trailer swivel of this invention incorporates a gooseneck-shaped axle to carry a standard wheel rim and tire. The axle is removably received within a swivel housing which is pivotably mounted on the tongue bar of a trailer, and pivotable to position the wheel between a raised position above the tongue bar, a lowered position below the tongue bar, and intermediate positions therebetween. The trailer swivel is secured at each of these positions by a spring loaded locking pin which is carried on the swivel housing, and the axle may rotate or swivel within the swivel housing to permit the trailer to be maneuverably repositioned while the trailer tongue is supported by the wheel rim and tire. The trailer swivel assembly is mounted on the tongue bar using a face plate and brackets clamped together from opposing sides of the tongue bar with threaded bolts.

DESCRIPTION OF THE PREFERRED EMBODIMENTS

Figure 1:
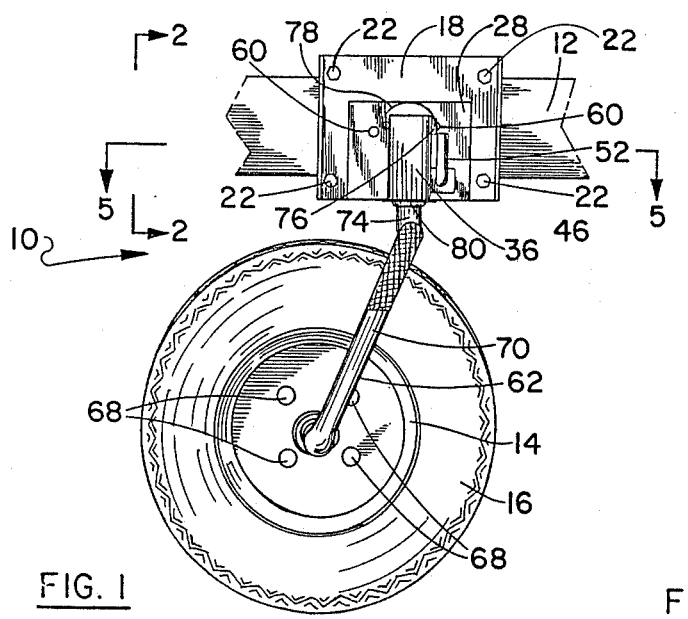
FIG. 1 is a side elevation view showing the trailer swivel wheel of this invention in the lowered position.

The trailer swivel wheel assembly of this invention is shown in FIGS. 1-5 and is referenced generally therein by the numeral 10.

The trailer swivel wheel assembly 10 of this invention may be mounted on any one of several existing trailer frames. Such frames are generally of either a straight or Y-shaped design, depending upon the size, load, and purpose of the trailer. The trailer frames are connected to the rear of a vehicle by a tongue bar 12 having a hitch assembly (not shown) at the foremost end. While some trailers are light enough or balanced, even when fully loaded, such that the tongue may be manually lifted by an individual, in which case the tongue bar 12 will usually include a handle near the hitch assembly. In heavier or unbalanced trailers, it may be necessary to use a jack to lift the tongue bar 12 when coupling or uncoupling the hitch assembly to or from the vehicle.

The trailer swivel wheel assembly 10 is designed to be used with a standard size trailer wheel rim 14 and an inflatable tire 16 which is mounted on that wheel rim 14. Any size and type of wheel rim 14 and tire 16 suitable for the particular use of supporting the front end of the trailer may be used, and in some applications it may be preferrable to use a spare wheel rim 14 and tire 16 from the trailer or vehicle. It may also be preferrable in some situations to use a solid wheel, as with other trailer swivel wheels, along with the appropriate corresponding hub assembly.

The tongue bar 12 on most recreational and multi-purpose trailer frames is generally formed from square tubular steel having a cross section of between two to five inches in height and width. The trailer swivel wheel assembly 10 may be mounted directly on a straight tongue bar 12 as shown in FIG. 1, or upon any suitable lateral or longitudinal frame cross member.

Figure 5:
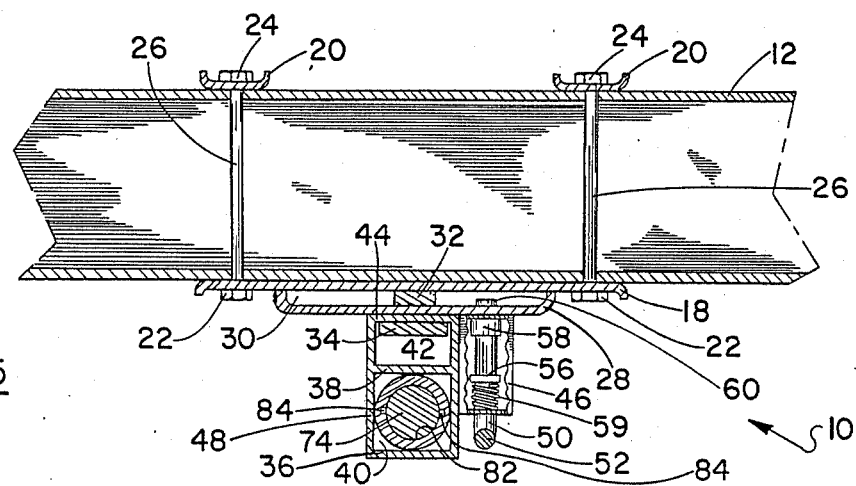
FIG. 5 is a partially cut away cross sectional view of the trailer swivel of FIG. 1 taken through line 5—5 in FIG. 1.

Referring to FIGS. 1 and 5, the trailer swivel wheel assembly 10 is mounted on the tongue bar 12 using a face plate 18 and a pair of brackets 20. The face plate 18 is positioned in abutting contact with one side of the tongue bar 12, with the brackets 20 on the opposing side of the tongue bar 12, so that the top and bottom edges of the face plate 18 and brackets 20 extend above and below the top and bottom surfaces of the tongue bar, respectively. The face plate 18 and brackets 20 are then connected together and compressed inwardly against the tongue bar with four threaded bolts 22 and hex or wing nuts 24, with the bolts 22 optionally being covered with protective tubular metal sleeves 26. The four bolts 22 are inserted through apertures which extend entirely through the surface of the face plate 18 and are aligned with apertures extending entirely through the surface of the brackets 20. The side edges of the face plate 18 and brackets 20 may be curved outward away from the tongue bar 12 as shown in FIG. 5 to protect the bolts 22 and nuts 24, and to prevent the surface of the tongue bar 12 from being scratched. A cloth, plastic, cork, or rubber pad may be placed between the adjacent surfaces of the tongue bar 12, face plate 18, and brackets 20 to further protect any finished surfaces.

A spacer plate 28 having total width and height dimensions somewhat smaller than the face plate 18 is attached thereto, the edges of the spacer plate 28 being curved inwardly toward the face plate 18 to form a space 30 therebetween.

The spacer plate 28 defines a large diameter aperture through which a swivel shaft 32 is received, the swivel shaft 32 being attached to the face plate 18 at one end, and having a retaining ring 34 of greater diameter than the swivel shaft 32 at the opposing end. The swivel shaft 32 and spacer plate 28 are attached to the face plate 18 by welding or other suitable fastening means.

Adjacent to the spacer plate 28 and rotatably mounted on the swivel shaft 32 is a swivel housing 36 in the form of a generally rectangular steel tube. An interior wall 38 bisects the swivel housing 36 into two separate compartments 40, 42. The first compartment 40 has a generally square cross section, while the second compartment 42 has a rectangular cross section with a width equal to that of the first compartment 40, and a depth greater than the thickness of the retaining ring 34 on the swivel shaft 32.

The side wall 44 of the swivel housing 36 adjacent the spacer plate 28 defines a circular aperture extending entirely through the surface of that side wall 44 of a diameter great enought to slidably receive the swivel shaft 32 and permit the swivel housing 36 to pivotably rotate about the swivel shaft 32.

For assembly wherein the retaining ring 34 is an integral part of, or is attached to, the swivel shaft 32 prior to the swivel shaft 32 being attached to the face plate 18, the second compartment 42 should have a depth great enough such that the swivel shaft 32 and attached retaining ring 34 may be inserted through one of the open ends of the second compartment 42 and aligned with the aperture which extends through the side wall 44 facing the spacer plate 28, with the swivel shaft 32 then being slidably received through that aperture and therein comprising a pivot means on which the swivel housing 36 may be pivoted.

A locking pin housing 46 having a generally rectangular shape is attached to one side 48 of the swivel housing 36 perpendicular to and closely confronting the spacer plate 28. The locking pin housing 46 defines a pair of circular apertures extending entirely through the end surfaces of the locking pin housing 46, one aperture being located at the end of the locking pin housing 46 adjacent to the spacer plate 28, and the other aperture being located at the opposing end of the locking pin housing. The apertures are aligned to slidably receive a locking pin 50 therethrough, with the locking pin housing 46 forming a locking pin support member, the locking pin 50 being of a generally rigid metal which is resistant to sheer forces. The locking pin 50 is bent in a generally L-shaped manner to present a handle segment 52 as shown in FIG. 5. The locking pin 50 may be made to pivot freely within the locking pin housing 46, or maintain a constant orientation relative to the locking pin housing 46.

Within the locking pin housing 46, a coil-type spring 54 is wrapped in circumscribing relation to the locking pin 50. The coil spring 54 abuts the inner surface of the locking pin housing 46 at the end opposing the spacer plate 28. A spring retaining collar 56 contacting the opposite end of the coil spring 54 is attached to the locking pin 50 such that the coil spring 54 is compressed between the spring retaining collar 56 and the inner surface of the locking pin housing 46. The coil spring 54 thereby exerts pressure on the spring retaining collar 58 and locking pin housing 46, which in turn urges the locking pin 50 toward the spacer plate 28. The locking pin 50 may be manually retracted by a force opposing the spring force and exerted on the handle segment 52 of the locking pin 50. A guide collar 58 extending inwardly from the inner surface of the locking pin housing 46 adjacent the spacer plate 28 and circumscribing the locking pin 50 prevents the locking pin 50 from becoming misaligned with the corresponding aperture in the locking pin housing 46 if the locking pin 50 is retracted completely into the locking pin housing 46.

The swivel shaft 32 defines a center of rotation about which the swivel housing 36 and locking pin housing 46 may be pivotably rotated. A plurality of locking pin apertures 60, each having a diameter sufficient to slidably yet engagingly receive the locking pin 50, extend entirely or substantially through the surface of the spacer plate 28. The locking pin apertures 60 are located at positions a distance from the center of rotation equal to the distance between the center of the locking pin and the center of rotation. Thus, as the swivel housing 36 and locking pin housing 46 are rotated about the swivel shaft 32, the locking pin 50 will alternately and sequentially be aligned with each of the locking pin apertures 60 such that the pressure exerted by the coil spring 54 may urge the locking pin 50 through any locking pin aperture 60, and the locking pin 50 may be selectively retracted from any aperture 60.

In some applications, it may be desirable to attach the swivel shaft 32 directly to the spacer plate 28, to attach the spacer plate 28 flush against the face plate 18, or to eliminate the spacer plate 28 completely. Eliminating the spacer plate 28, or mounting the spacer plate 28 flush against the face plate 18, eliminates the space 30 in the region of the apertures 60 which is useful to ensure the maximum engagement between the locking pin 50 and the apertures 60 in the spacer plate 28, and additionally allows the spacer plate 28 to be bowed slightly to maintain a slight frictional contact between the retaining ring 34 on the swivel shaft 32 and the swivel housing 36 so as to prevent the swivel housing 36 from rocking or tilting laterally relative to the spacer plate 28 or tongue bar 12.

Figure 2:
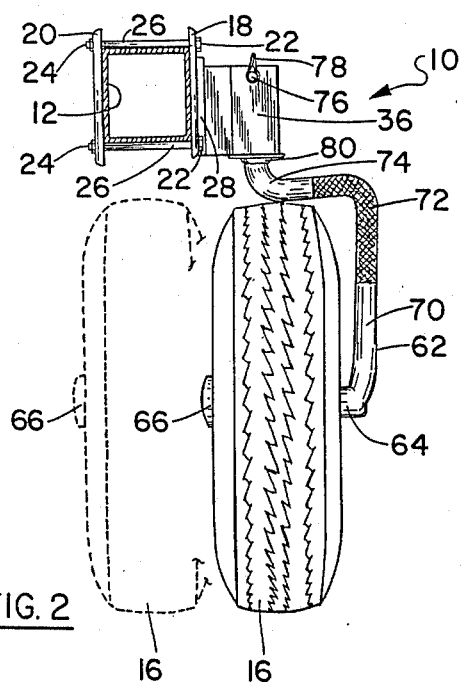
FIG. 2 is a front elevation view of the trailer swivel wheel of FIG. 1 taken from line 2—2 in FIG. 1, with an alternate placement of the tire shown in phantom.
Figure 4:
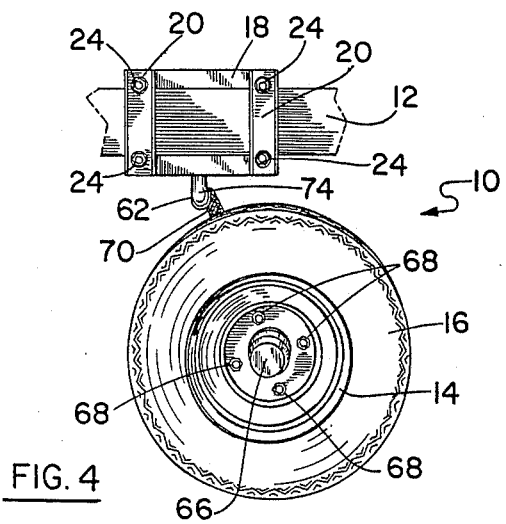
FIG. 4 is a side elevation view of the trailer swivel wheel of FIG. 1 taken from the opposite side as in FIG. 1.

Referring now to FIGS. 1 and 2, it can be seen that the swivel housing 36 is connected to an axle 62 which is in turn connected to the wheel rim 14 and tire 16.

The particular 'gooseneck' type axle 62 shown in FIGS. 1 and 2 comprises a generally horizontal wheel axle segment 64 on which the wheel rim 14 is mounted using a conventional hub 66 and bolts 68, a generally vertical intermediate segment 70 extending in an upward angle from the axle segment 64, a horizontal cross segment 72 extending from the top of the vertical intermediate segment 70 in the same direction and generally parallel to the axle segment 64, and a vertical top segment 74 extending upwardly from the end of the cross segment 72. Each of the various segments 64, 70, 72, 74 of the axle 62 may be angled relative to one another to maximize the strength or resiliency of the axle, to provide the appropriate clearance, or to enhance the aesthetic appeal of the trailer swivel wheel assembly 10. The axle 62 may be formed from a single peice of steel rod bent to produce the various segments 64, 70, 72, 74, or may be assembled from a plurality of separate components.

The vertical top segment 74 of the axle 62 is slidably and rotatably received within the swivel housing 36, with the diameter of the top segment 74 being approxamately equal to the inside width and depth of the swivel housing 36. The top segment 74 of the axle 62 may be mounted within the swivel housing 36 in any of a variety of manners. The top segment 74 may include a bore hole extending perpendicularly through the center thereof, with the swivel housing 36 being fitted with two corresponding apertures which may be aligned with the bore hole when the top segment 74 is inserted into the swivel housing 36, the apertures and bore hole then receiving a cotter pin 76 securing and retaining the top segment 74 of the axle 62 within the swivel housing 36. The cotter pin 76 may be of the type commonly used to secure latches and connections on recreational vehicles, having a semi-circular wire band 76 pivotably connected to one end of the cotter pin 76, with the wire band 78 forming a loop which is sprung over the opposing end of the cotter pin 76 to prevent the cotter pin 76 from being inadvertantly removed.

Alternately, or in conjunction with the above described mounting means, the axle 62 and swivel housing 36 may be equipped with an axle swivel bearing 80 to permit the top segment 74 of the axle 62 to rotate freely within the swivel housing 36. The axle swivel bearing 80 may be of any type commonly used with trailer wheels 14 and axles 62, or may be constructed of a simple tube and pin arrangement wherein a stationary tube 82 having an inside diameter approximately equal to the diameter of the top segment 74 of the axle 62 is fastened inside the first compartment 40 of the swivel housing 36, and a second removable sleeve (not shown) slightly displaced from the stationary tube 82 removably fastened within the swivel housing 36. The top segment 74 of the axle 62 has one or more projecting pins 84, or a circumfral ring, attached in circumscribing relation thereto, the pins 84 or ring being situated in the space between the stationary tube 82 and removable sleeve. The removable sleeve may be removed from the swivel housing 36 and placed over the top segment 74 of the axle 62. The top segment 74 of the axle 62 is then inserted into the stationary tube 82, and the removable sleeve inserted into the swivel housing 36 and fastened thereto. Thus, the top segment 74 of the axle 62 may rotate within the swivel housing 36, and the axle 62 may selectively be removed from the swivel housing 36 to disassemble the trailer swivel wheel assembly 10.

In operation, the front portion of the trailer frame and tongue bar 12 should be supported either by the hitch and vehicle, or by an appropriate support block or jack assembly. The wheel rim 14 and tire 16 should be mounted onto the wheel axle segment 64 of the axle 62 prior to mounting the axle 62 within the swivel housing 36.

The trailer swivel wheel assembly 10 of this invention is then mounted on the forward portion of a tongue bar 12 or suitable frame member using the face plate 18, brackets 20, bolts 22, nuts 24, and protective sleeves 26 as described above. Once the trailer swivel wheel assembly 10 is firmly and securely mounted on the tongue bar 12, the top segment 74 of the axle 62 may be mounted within the swivel housing 36 using one of the various methods described above. The locking pin 50 should be securely engaged within one of the locking pin apertures 60 corresponding to the fully lowered, ground engaging position of the trailer swivel wheel assembly 10 as shown in FIGS. 1 and 2.

The trailer may then be uncoupled from the vehicle and the front of the trailer supported directly by the trailer swivel wheel assembly 10, wheel rim 14, and tire 16, with the trailer capable of being rolled, turned, and otherwise maneuverably repositioned using the trailer swivel wheel assembly 10.

If it is necessary to turn the tire 16 and wheel rim 14 without rolling the tire 16 a significant degree, additional leverage may be obtained by grasping the axle 62 at the upper end of the intermediate segment 70 or the outer end of the cross segment 72. Adjacent portions of these segments 70, 72 may be knurled or stippled as shown in FIGS. 1 and 2, or may be covered with a flexible foam-rubber handgrip (not shown), to provide a gripping region for this purpose.

Figure 3:
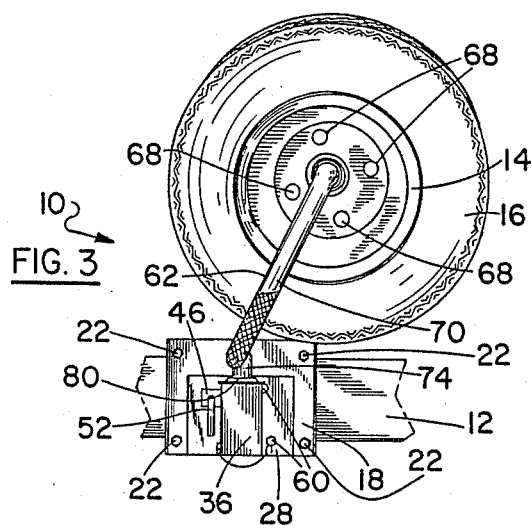
FIG. 3 is a side elevation view of the trailer swivel wheel of FIG. 1 in the raised position.

Once the trailer has been repositioned as desired, the trailer may be recoupled to the vehicle using the hitch. When the front of the trailer is completely supported by the vehicle or jack, the handle portion 52 of the locking pin 50 may be grasped and pulled, thus retracting the locking pin 50 from the locking pin apertures 60 in the spacer plate 28. Once the locking pin 50 is clear of the spacer plate 28, the wheel rim 14 and tire 16 may be swiveled upwardly by pivoting the swivel housing 36 upon the swivel shaft 32 until the wheel rim 14 and tire 12 are in the desired raised position. The raised position may be any position between the completely lowered position in which the wheel rim 14 and tire 16 are disposed entirely or maximally below the tongue bar 12, and a completely raised position wherein the wheel rim 14 and tire 16 are entirely or maximally raised above the tongue bar 12, or substantially displaced from the completely lowered position. The relative locations of the locking pin apertures 60 defining these raised and lowered positions will depend upon the type of trailer used, and the particular desires of the user. It has been found that for general purposes, three locking pin apertures 60 defining a lowered position as shown in FIG. 1, a raised position as shown in FIG. 3, and an intermediate position between the raised and lowered positions have proven suitable. The raised position should provide sufficient road clearance to permit towing the trailer behind the vehicle over the expected terrain without the tire 16, wheel rim 14, or axle 62 contacting or striking any portion of the road or objects which the vehicle might pass over.

It may be seen in FIGS. 1 and 2 that the wheel rim 14 and tire 16 are castered in both the longitudinal direction generally parallel to the tongue bar 12 of the trailer, and in the lateral direction generally perpendicular to the tongue bar 12 of the trailer. The placement and orientation of the tire 16 and wheel rim 14 shown provides an efficient castering effect, making the maneuvering of a loaded trailer less difficult.

In some applications, it may be preferrable to position the wheel 14 and tire 16 at a different location relative to the tongue bar 12 when the trailer swivel wheel assembly 10 is in the completely lowered position so as to to enhance the balance, strength, or alignment characteristics of the trailer swivel wheel assembly 10. The axle segment 64 and cross segment 72 of the axle 62 may therefore be lengthened or shortened as desired, or the angle of the intermediate segment 70 adjusted, as shown in phantom in FIG. 2.

If the axle segment 64 of the axle 62 is lengthened such that all or a portion of the tire 16 is disposed vertically beneath the tongue bar, a different procedure must be followed for pivoting the trailer swivel wheel assembly 10 upwards into the completely raised position. The tire 16 and wheel rim 14 must be turned perpendicular to the tongue bar 12 by rotating the top segment 74 of the axle 62 within the swivel housing 36, and the swivel housing 36 then rotated on the swivel shaft 32 to pivot the tire 16 and wheel rim 14 upward to a position immediately below the tongue bar 12, with the cross segment 72 disposed above the wheel 14. The top segment 74 of the axle 62 must then be rotated within the swivel housing 36 approximately 180 degrees to position the tire 16 and wheel rim 14 immediately above the tongue bar 12, and the swivel housing 36 then pivoted upwards to the completely raised position wherein the tire 16 and wheel rim 14 are disposed substantially above the tongue bar 12.

In some applications, when the wheel rim 14 and tire 16 may not be pivoted either forward or backward into the raised or lowered position due to some physical obstruction or other accessory being attached to the trailer frame, the axle 62 may simply be removed from the swivel housing 36, the swivel housing 36 pivoted, and the axle 62 reinserted. It is also possible, in this instance, to omit the swivel shaft 32, attach the swivel housing 36 directly to the face plate 18 or spacer plate 28, and have the swivel housing 36 be symmetrical and stationary such that the axle 62 may be inserted and secured from above or below the tongue bar 12.

While the preferred embodiments of the present invention have been described, it should be recognized that various changes, adaptations, and modifications may be made therein without departing from the spirit of the invention and scope of the appended claims.

What is claimed is:

1. A trailer swivel for use with a trailer having a tongue, and a wheel rim having a tire mounted thereon. said trailer swivel comprising:
   a housing member connected to said mounting means;
   a gooseneck axle, one end of said axle being rotatably mounted on said housing member, the opposing end of said axle having hub means upon which the wheel rim may be removably mounted, said gooseneck axle including a generally horizontal wheel axle segment, a generally vertical intermediate segment connected to and extending at a generally upward angle from said axle segment, a generally horizontal cross segment connected to and extending from said intermediate segment in generally the same direction and generally parallel with said axle segment, and a top segment connected to and extending upwardly from said cross segment, a portion of said generally vertical intermediate segment and an adjacent portion of said generally horizontal cross segment defining a handgrip region for gripping said axle in order to swivel the wheel rim and tire;
   securing means for securing said axle to said housing member;
   pivot means for pivoting said housing member relative to the mounting means such that the wheel rim and tire may be selectively moved between a first ground engaging position whereat the wheel rim and tire are disposed generally below the tongue of the trailer and a second raised position whereat the wheel rim and tire are displaced from said first ground engaging position; and
   locking means to engagingly lock the pivot means in said first or in said second position.

2. The trailer swivel of claim 1 wherein the wheel rim and tire are disposed substantially under the tongue of the trailer when the wheel rim and tire are moved to the lowered position.

3. The trailer swivel of claim 1 wherein the mounting means includes a plate, said plate being oriented in a generally vertical plane and located adjacent the tongue of the trailer, and wherein the locking means further comprises:
   a plurality of apertures extending substantially through the surface of the plate;
   locking pin support means connected to and carried on the housing member;
   a locking pin, said locking pin being slidably mounted on said locking pin support means, at least a portion of said locking pin extending outwardly from said locking pin support means and closely confronting the plate, said locking pin further being alignable with said apertures as said locking pin support means and the housing member are pivoted between the first position and the second position; and
   spring means positioned to urge said locking pin towards the plate, whereby the locking pin may be engagingly received within a selected one of said apertures in the plate as said locking pin is aligned with said apertures when the locking pin housing and the housing member are pivoted between the first position to the second position, at least one of said apertures corresponding to the first position and at least one of said apertures corresponding to the second position.

4. The trailer swivel of claim 3 wherein the mounting means defines a space proximate to a region of the plate adjacent the apertures, whereby the locking pin may extend entirely through the apertures in the plate and project into the space.

5. The trailer swivel of claim 3 wherein the locking pin support means comprises a housing within which the locking pin is slidably mounted and the spring means is contained.

6. The trailer swivel of claim 1 wherein the wheel rim and tire are disposed substantially below the tongue of the trailer when in the first position, and the wheel rim and tire are disposed substantially above the tongue of the trailer when in the second raised position.

7. The trailer swivel of claim 1 wherein the pivot means may be pivoted to a third intermediate position disposed between the first ground engaging position and the second raised position, the locking means further comprising means to lock the pivot means at said third position.

8. The trailer swivel of claim 7 wherein the wheel rim and tire are disposed at generally the same height as the tongue of the trailer relative to the ground when the pivot means is pivoted to the third intermediate position.

9. A trailer swivel for use with a trailer having a tongue, and a wheel rim having a tire mounted thereon, said trailer swivel comprising:
   a housing member connected to said mounting means;
   a gooseneck axle, one end of said axle being rotatably mounted on said housing member, the opposing end of said axle having hub means upon which the wheel rim may be removably mounted, said gooseneck axle including a generally horizontal wheel axle segment, a generally vertical intermediate segment connected to and extending at a generally upward angle from said axle segment, a generally horizontal cross segment connected to and extending from said intermediate segment in generally the same direction and generally parallel with said axle segment, and a top segment connected to and extending upwardly from said cross segment;

securing means for securing said axle to said housing member;

pivot means for pivoting said housing member relative to the mounting means such that the wheel rim and tire may be selectively moved between a first ground engaging position whereat the wheel rim and tire are disposed generally below the tongue of the trailer and a second raised position whereat the wheel rim and tire are displaced from said first ground engaging position, with the wheel rim and tire displaced in a longitudinal direction relative to said housing member and displaced laterally relative to the tongue of the trailer when the wheel rim and tire are in said lowered position such that the wheel rim and tire are castered relative to said housing member and the tongue of the trailer; and locking means to engagingly lock the pivot means in said first or in said second position.

10. The trailer swivel of claim 9 wherein the wheel rim and tire are disposed substantially under the tongue of the trailer when the wheel rim and tire are moved to the lowered position.

11. The trailer swivel of claim 9 wherein the mounting means includes a plate, said plate being oriented in a generally vertical plane and located adjacent the tongue of the trailer, and wherein the locking means further comprises:

a plurality of apertures extending substantially through the surface of the plate;

locking pin support means connected to and carried on the housing member;

a locking pin, said locking pin being slidably mounted on said locking pin support means, at least a portion of said locking pin extending outwardly from said locking pin support means and closely confronting the plate, said locking pin further being alignable with said apertures as said locking pin support means and the housing member are pivoted between the first position and the second position; and spring means positioned to urge said locking pin towards the plate, whereby the locking pin may be engagingly received within a selected one of said apertures in the plate as said locking pin is aligned with said apertures when the locking pin housing and the housing member are pivoted between the first position to the second position, at least one of said apertures corresponding to the first position and at least one of said apertures corresponding to the second position.

12. The trailer swivel of claim 11 wherein the mounting means defines a space proximate to a region of the plate adjacent the apertures, whereby the locking pin may extend entirely through the apertures in the plate and project into the space.

13. The trailer swivel of claim 11 wherein the locking pin support means comprises a housing within which the locking pin is slidably mounted and the spring means is contained.

14. The trailer swivel of claim 9 wherein the wheel rim and tire are disposed substantially below the tongue of the trailer when in the first position, and the wheel rim and tire are disposed substantially above the tongue of the trailer when in the second raised position.

15. The trailer swivel of claim 9 wherein the pivot means may be pivoted to a third intermediate position disposed between the first ground engaging position and the second raised position, the locking means further comprising means to lock the pivot means at said third position.

16. The trailer swivel of claim 15 wherein the wheel rim and tire are disposed at generally the same height as the tongue of the trailer relative to the ground when the pivot means is pivoted to the third intermediate position.

* * * * *